United States Patent [19]
Mezey

[11] Patent Number: 5,230,393
[45] Date of Patent: Jul. 27, 1993

[54] REFUSE COLLECTION AND WEIGHING SYSTEM

[76] Inventor: Armand G. Mezey, 2724 W. Palm La., Phoenix, Ariz. 85009

[21] Appl. No.: 722,147

[22] Filed: Jun. 27, 1991

[51] Int. Cl.$^5$ ............................................. G01G 19/08
[52] U.S. Cl. .................................. 177/139; 177/145; G01G/19/08
[58] Field of Search ......................... 177/139, 145, 185

[56] References Cited

U.S. PATENT DOCUMENTS

| | | | |
|---|---|---|---|
| 4,645,018 | 2/1987 | Garbade et al. | 177/139 X |
| 4,714,122 | 12/1987 | Appleton et al. | 177/139 |
| 5,004,392 | 4/1991 | Naab | 177/139 X |
| 5,119,894 | 6/1992 | Crawford et al. | 177/139 X |

*Primary Examiner*—George H. Miller, Jr.
*Attorney, Agent, or Firm*—Gregory J. Nelson

[57] ABSTRACT

A loader for a mobile refuse collection vehicle having a lift for engaging and transporting a refuse container from the ground to an elevated dump position and return. The container engaging means include a weighing device to provide a signal representative of the refuse weight. Discrete indicia, preferably machine readable, are associated with each container. The information relative to the refuse weight and container identification are processed and stored for billing and route management purposes. The weighing device preferably is a load cell. The corresponding method of determining the weight of collected refuse is also disclosed.

13 Claims, 5 Drawing Sheets

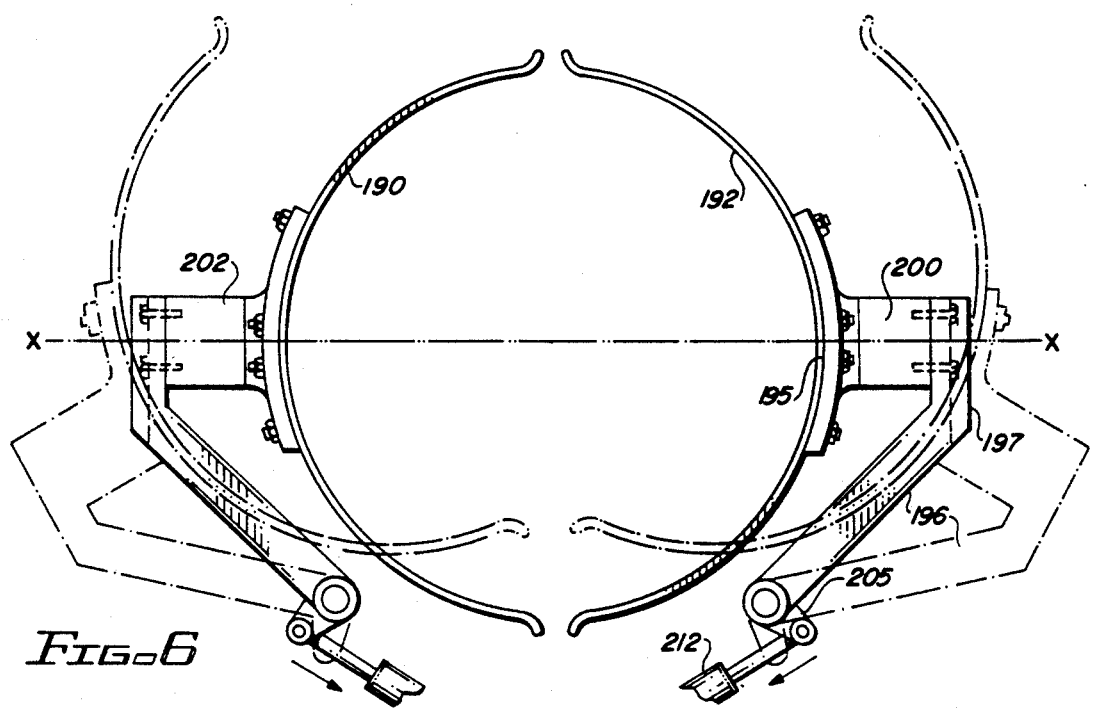
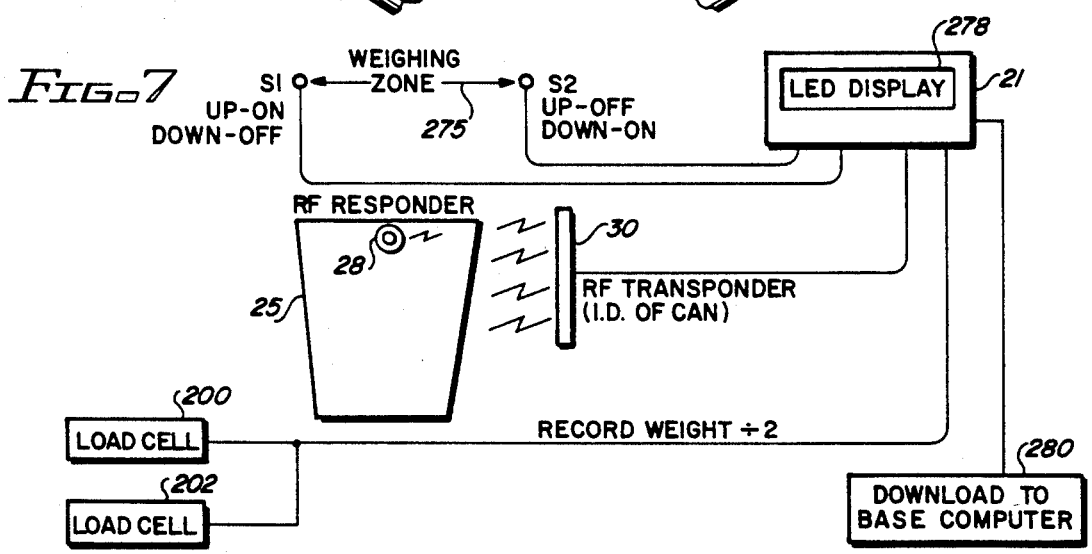
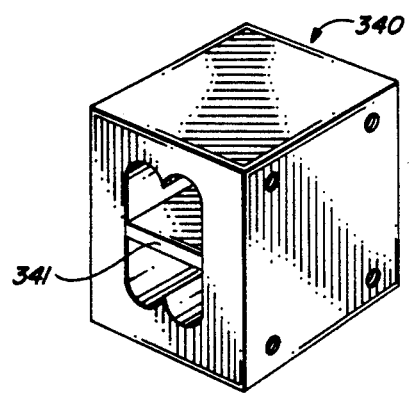

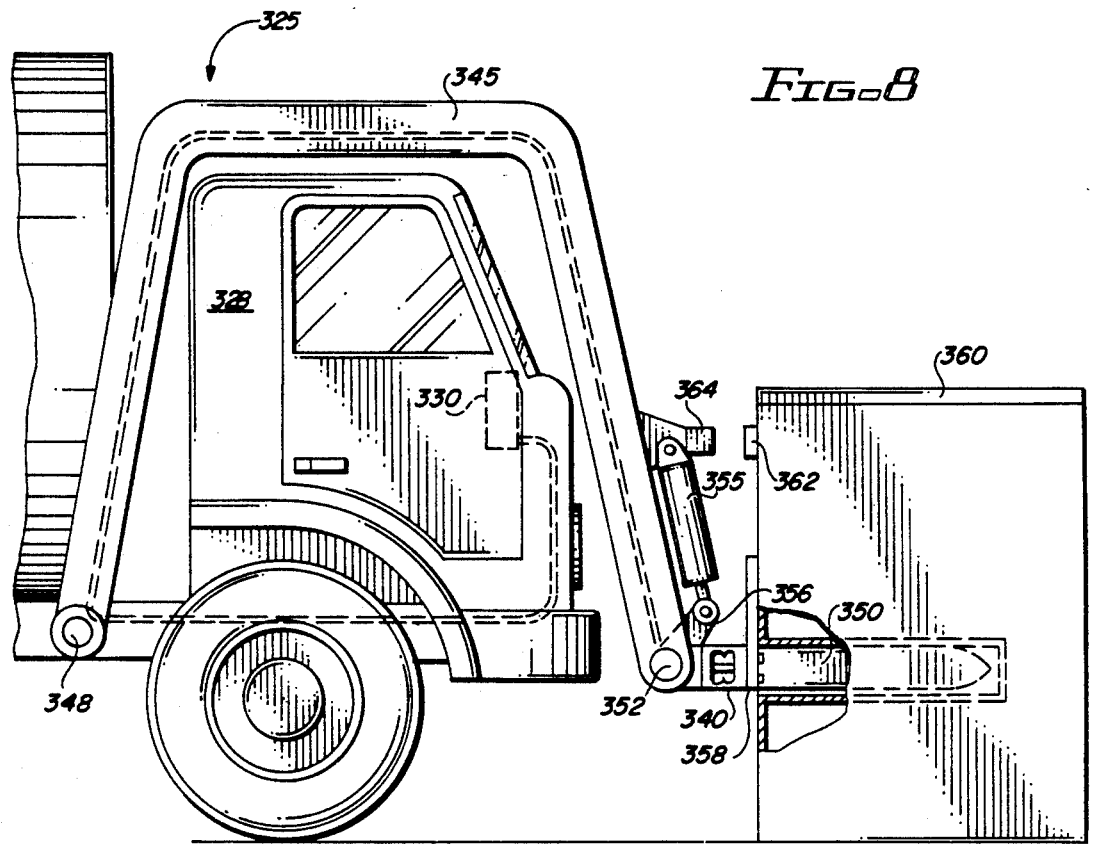
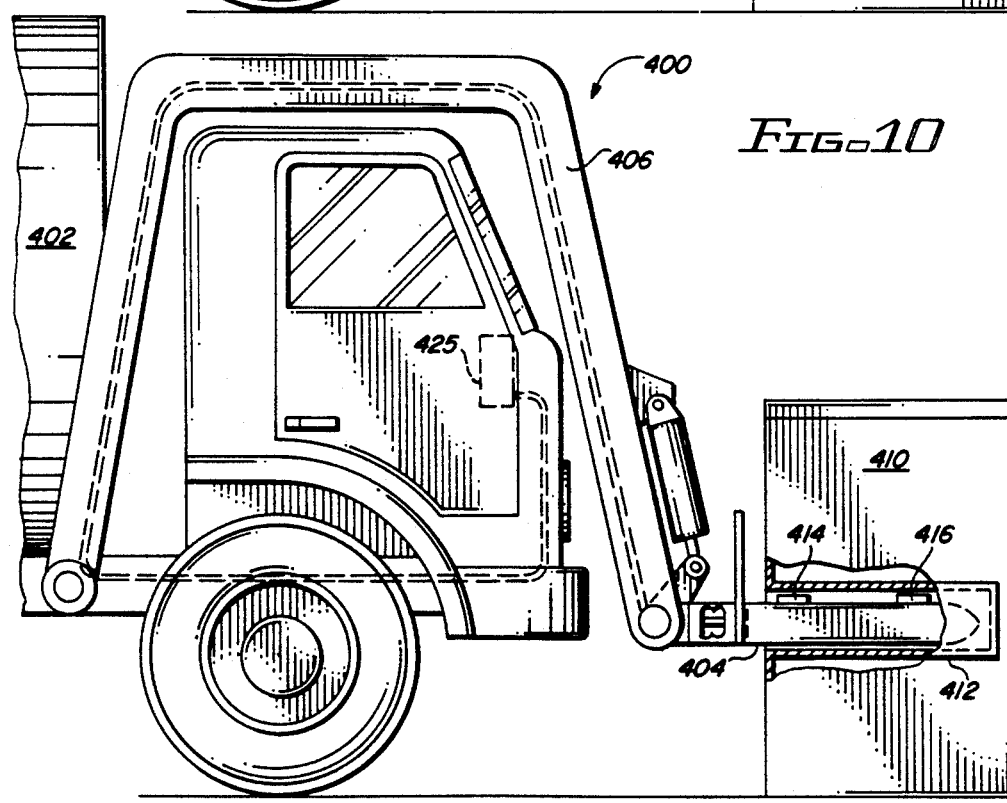

REFUSE COLLECTION AND WEIGHING SYSTEM

BACKGROUND OF THE INVENTION

1. Field Of The Invention

The present invention relates to a refuse loader and more particularly to a mobile refuse or trash collection loader for lifting and emptying on-site trash containers into the compartment of a mobile collection vehicle and simultaneously reading identification indicia on the trash container and weighing the contents of the container.

Mobile trash or refuse collection systems are well known and are widely utilized to efficiently collect large volumes of trash such as residential and commercial waste. These systems generally utilize on-site trash collection containers of various sizes and shapes typically containing from approximately 50 to 300 or more gallons. The on-site containers are filled with trash or refuse by the users and periodically the contents of the container are transferred to a mobile collection vehicle and the refuse taken to the dump, landfill, or recycling center. The term "refuse" as used herein generally refers to all types of residential and commercial trash, garbage and waste.

Generally both residential and commercial users are periodically charged a flat rate such as a monthly fee dependant upon the number of collection pick-ups and the size of the containers. This fee is charged regardless of the actual amount of trash and the weight of the trash collected from the user. Such a fee system has certain inherent unfairness as those users with large quantities of refuse pay the same as those users who contribute less volume and weight of refuse. In addition to allowing users to be charged on a more equitable basis in relation to the weight of deposited refuse, the system of the present invention allows the contents of the containers to be individually weighed to provide the collection vehicle driver a current indication of the load. Thus, when load limits are approached, the driver will know to interrupt the collection procedure and return to the dump site.

Further, information concerning refuse weight at various collection locations will allow collection vehicles to be more efficiently scheduled and routes accordingly arranged in relation to the customer requirements. At present, many collection routes are somewhat arbitrarily scheduled based on estimated or anticipated loads as the refuse collection company or department has no accurate and effective way of continuously monitoring the weight of trash collected along various scheduled routes. State-of-the-art weighing systems simply use conventional scales or utilize hydraulic pressure which systems are notoriously inaccurate.

Accordingly, there exists a need for a mobile refuse collector system which will identify each container along the route and provide highly accurate and reliable information concerning the weight of the trash or refuse picked up at each location.

Accordingly, it is a primary object of the present invention to provide an improved refuse collection system which both weighs and identifies each refuse container.

It is another object of the present invention to provide a refuse collection loading apparatus and method providing substantial environmental and economic benefits.

Briefly, in accordance with the system of the present invention, a loader for a mobile refuse collection vehicle is provided which is adapted to be mounted on the refuse vehicle as the vehicle proceeds along a collection route. The collection vehicle normally stops adjacent a refuse container with the loader aligned with the container. The loader will engage the container using suitable engagement means such as interlocking mechanisms or gripping arms which are selectively closable by gripping actuators to engage the refuse container. The engagement means are part of a carriage which traverses a lift arm or arms on a set of guide wheels within guide tracks. In one embodiment, a length of drive chain operates to move the loader assembly along the guide tracks through a motor and sprocket. The lift mechanism is operable to move the carriage and engaged container upwardly along the track to a position where the container is at least partially inverted causing the contents of the refuse container to be dumped into the receiving area of the associated refuse collection vehicle. After dumping, the carriage along with the empty container returns down the lift to the home position. The lift may be fixed or may be of the type where a portion of the lift and carriage are laterally extendable from the vehicle to engage the container.

Machine readable indicia on each of the refuse containers and an indicia reading device associated with the loader assembly or vehicle automatically recognizes the indicia and will store this information preferably on a machine readable card or disk in a microprocessor carried by the vehicle.

In the preferred embodiment, the engagement means are supported on one or more weighing devices such as load cells preferably located so as to be positioned at opposite sides of the container on a line through the center of mass of the container. A weighing zone is provided on the lift assembly that reads the output of the load cells at selected locations during the upward travel of the loaded container. Some or all of the readings are mathematically averaged to provide the gross weight of the container and the contents. The output of the load cells is similarly scanned during the downward travel of the empty refuse container through the weighing zone. These readings are mathematically averaged to provide the tare weight of the empty container. The net refuse load dumped into the mobile unit is computed, stored in memory on a machine readable device. The operator is provided with an immediate indication of the total load on a cabmounted display. The weight of each container and the identity of each container is established for billing purposes and for route scheduling and is stored on a machine readable device in an onboard microprocessor. The machine readable device may be a card, disk or other information storing device such as RAM. These data are periodically transferrable to centralized computers to be processed and used to appropriately bill customers and for route management.

Preferably, the loader mechanism is of the type having container-engaging mechanism which may be moved outwardly from the side of the vehicle the desired distance to engage the container. The cycle of operation of the lift is automated with limit switches appropriately controlling the raising and lowering cycles of the loaded carriage.

In an alternate embodiment, the weight necessary load cells are positioned on the forks of a container lifting device.

BRIEF DESCRIPTION OF THE DRAWINGS

The above and other objects and advantages of the present invention will be more fully understood from the following detailed description of the invention taken along with the claims and drawings in which:

FIG. 6 is an enlarged plan view of the gripping arms and associated load cells;

FIG. 7 is a schematic diagram showing the components of the container identification and weighing system;

FIG. 8 is a side view of an alternate embodiment showing the weighing system in connection with a front end loader;

FIG. 9 is a detail perspective of the load cell shown in FIG. 8; and

FIG. 10 is a view similar to FIG. 8 showing still another embodiment of the invention in connection with a front loader.

DESCRIPTION OF THE PREFERRED EMBODIMENTS

Figure 1:
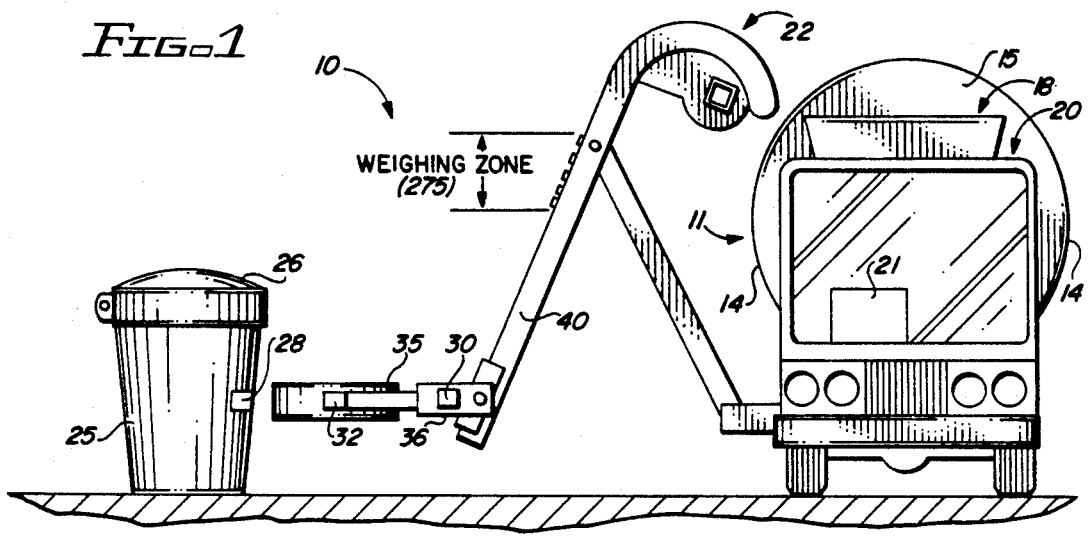
FIG. 1 is a front view of a refuse collection vehicle with the container collection loading and weighing system shown thereon.

Turning now to the drawings, FIG. 1 generally illustrates a refuse collection truck 11 equipped with the improved weighing system of the present invention which is designated by the numeral 10. The refuse truck is of conventional design having a mobile frame or chassis which support upstanding side walls 14, front wall 15 and a rear wall which define a compartment 18 for the reception of trash. As is conventional, refuse and trash is dumped into compartment 18 by a loader assembly 22 and may be periodically compressed by a hydraulically actuated pusher plate, not shown. The refuse truck 20 also includes a cab which houses the operator and controls and is the location of an on-board computer 21 as will be more fully explained hereafter. The details of the construction of the collection vehicle are conventional and well known. It is noted that the system of the present invention can be applied to any type of conventional refuse truck and may be used with side or front loading apparatus. However, for purposes of illustration, the weighing system of the present invention has been described with reference to a side loading apparatus.

In operation, the refuse truck 11 moves along a designated route until it reaches a pick-up station having one or more trash or refuse containers 25. The truck stops adjacent the refuse containers and by means of the loader assembly 22 engages the container 25 and lifts the container from the ground position to an elevated position at the upper end of the loader where the container is tilted so that the contents are dumped into the refuse compartment 18. The loader then returns the container to the ground or home position. The refuse containers 25 may be color coded, labeled or provided with some form of indicia for human, mechanical, optical or electrical detection and decoding identification to identify the particular refuse container.

Prior to dumping and preferably during the portion of the cycle in which the loaded container is being lifted from the ground position to the elevated position, the system has an identification system which includes a transponder tag 28 on the container 25 which passes near an ID scanner 30 which energizes the tag 28 transmitting an ID number to the on-board computer 21. In addition, the system is provided with load cells 32 associated with the container engaging assembly which provide a signal indicative of the loaded weight of the container and during the downward or return portion of the cycle will provide a signal indicative of the empty or tare weight of the container so that the on-board computer can compute the weight of the collected trash.

As indicated above, various types of loaders can be utilized with the weighing system including both fixed and extendible loaders. Representative loaders are shown in U.S. Pat. Nos. 5,007,786 and 3,910,434. Reference is also made to co-pending application, Ser. No. 480,815. For purposes of illustration, the loader system shown includes a carriage 36 as part of a loader mechanism which may be extended and retracted relative to the vehicle in a horizontal position. The carriage 36 travels along parallel guide rails which form a part of the assembly to elevate the container 25 to a dump position and returns the container to a position on the ground after dumping.

Figure 2:
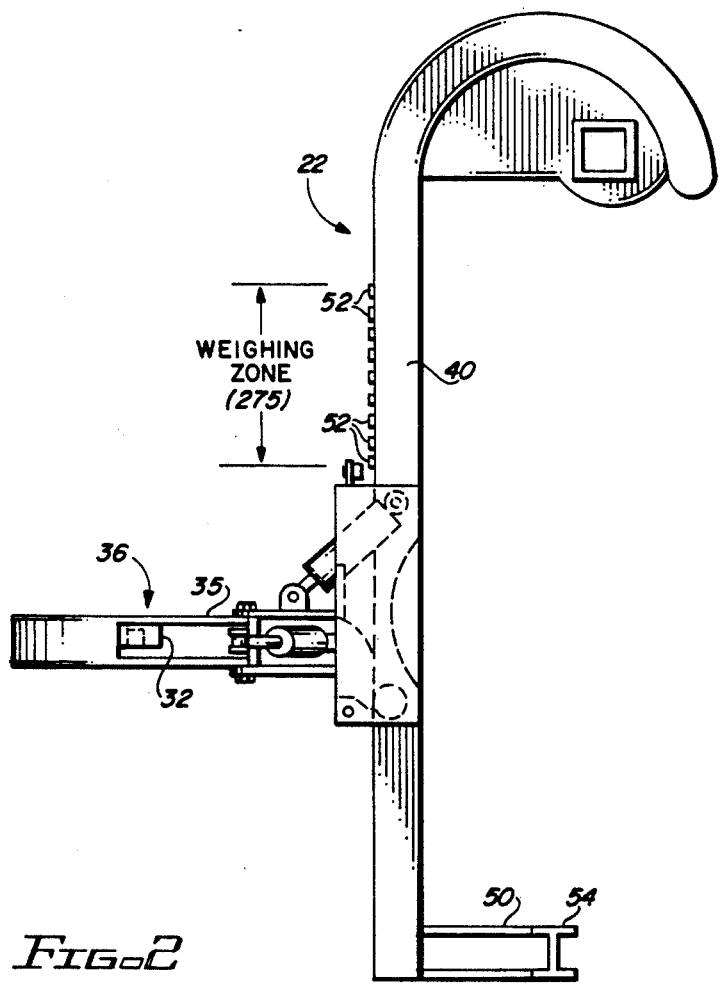
FIG. 2 is a side view showing the loader apparatus in a home position with the carriage aligned with the targets on the loader in the weighing zone.
Figure 3:
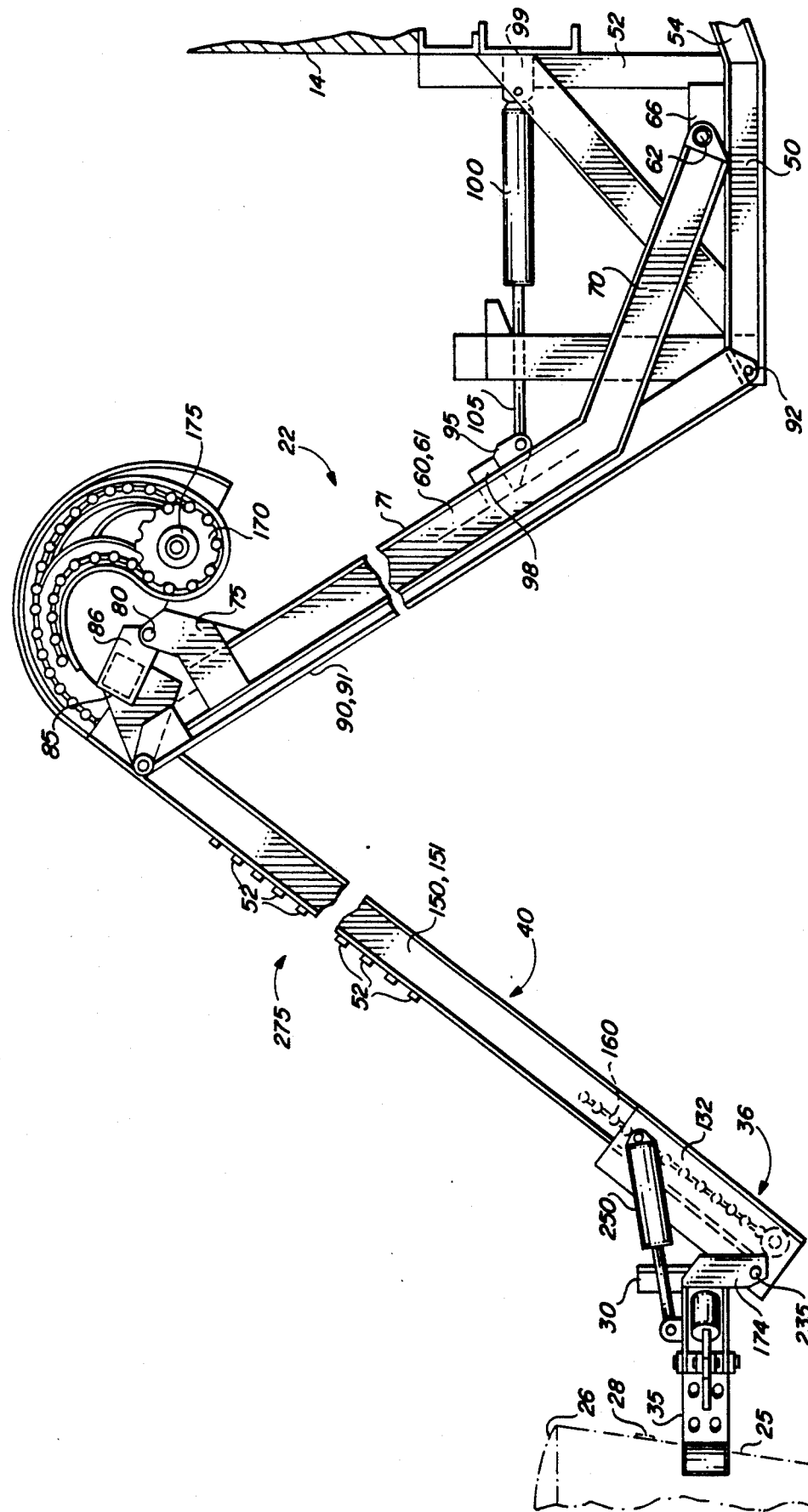
FIG. 3 is a side elevational view of the loader in an extended reach position.
Figure 4:
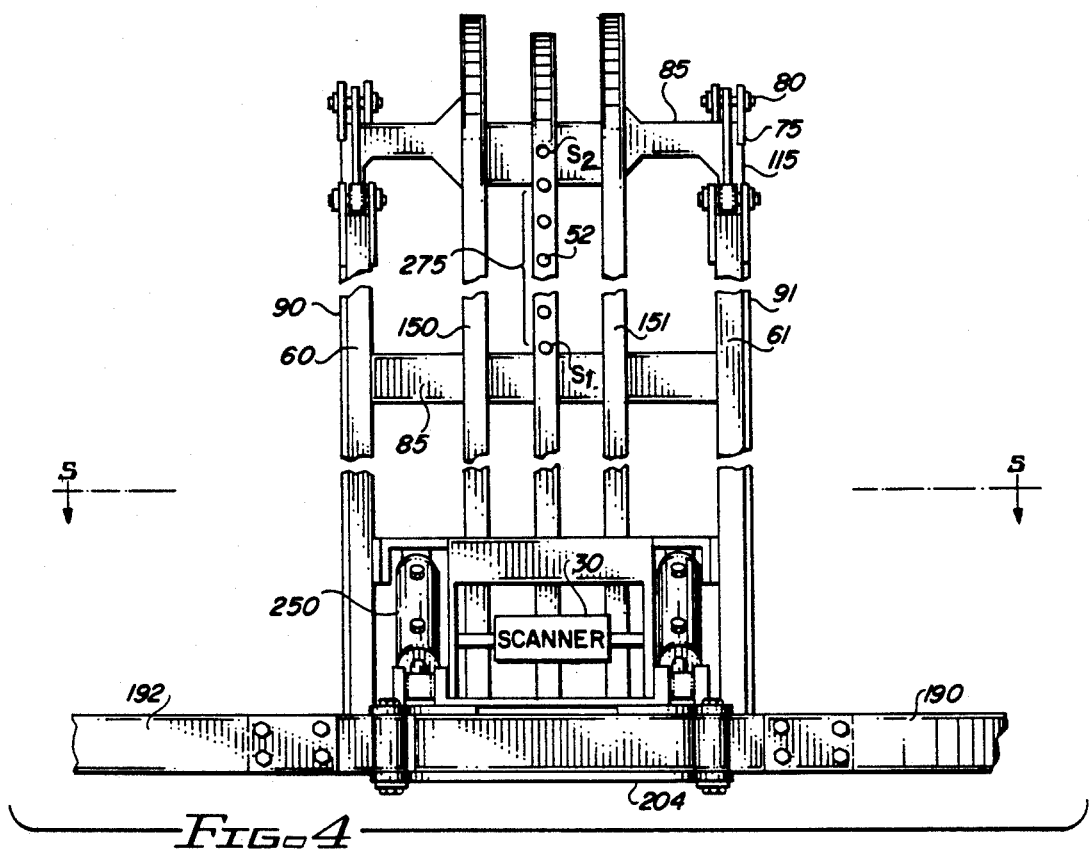
FIG. 4 is a front view of the loader.

FIGS. 2, 3 and 4 illustrate the loader assembly in greater detail. As shown in these figures, the refuse container 25 may have a generally cylindrical body or may have slightly tapered side walls with a cover or lid 26 hingedly secured to the container body. While conventional refuse containers, particularly for residential use, are generally configured as shown, the weighing system of the present invention may be used with containers of various other sizes and shapes such as rectangular containers.

The loader assembly 22 is shown mounted on one of the side walls 14 of the vehicle although other mounting locations such as the front or rear of the truck may be used. The loader assembly has a pair of generally horizontally extending spaced-apart frame members 50 supported from the vehicle chassis. A tie member 54 is connected to the intersection of the vertical and horizontal members 50 and 52 and extends beneath the vehicle secured to the opposite chassis members. A boom assembly includes a pair of parallel outer boom arms 60 and 61. Spaced-apart shafts 62 pivotally support outer boom arms 60 and 61 at their lower ends. The boom arms 60 and 61 are similarly constructed each shown as elongate tubular member having a pair of plates welded on opposite sides at the lower end of the member which plates have journal members 66 which receive the opposite ends of stub shafts 62.

Each of the boom arms has a lower section 70 which in the retracted position extends upwardly and outwardly from the pivot point. An upper arm section 71 in the normal retracted position assumes a generally vertical orientation along side the collection vehicle.

Transversely extending cross member 85 is shown as a box-like structural member which forms a part of a knuckle connection at the upper end of the boom members. Box member 85 is rotatably connected to shaft 80 at opposite ends at a location intermediate plates 75 by rearwardly extending plates 86.

A pair of inner boom arms 90 and 91 are spaced apart and are located between the outer boom arms. The lower ends of each of the inner boom arms 90 and 91 are pivotally attached to the distal end of support members 50 at pivot shafts 92. The pivot shafts are located outwardly and vertically below the location of the pivot shaft 62 about which the outer boom arms rotate. A clevis 95 is centrally attached to cross member 98 extending between the inner boom arms. Hydraulic actuator 100 is mounted in a generally horizontal position having its head end attached to cross member 99 extending between vertical frame members 52. Rod 105 of the hydraulic cylinder is connected to the clevis 95 secured between the inner boom arms. The actuator is operable to extend and retract the boom and lift assembly. When the actuator 100 is pressurized, the inner and outer boom arms assume the extended position as seen in FIG. 3. In this position, due to the geometric relationship of the pivot shaft 62, 92, 80 and 108 (which establish an irregular parallelogram) the cross member 85 will rotate. This arrangement is generally designated as a knuckle connection and is used to outwardly pivot the lift assembly with the lower ends of the lift arms 150, 151 in a generally horizontal, rectilinear path.

Figure 5:
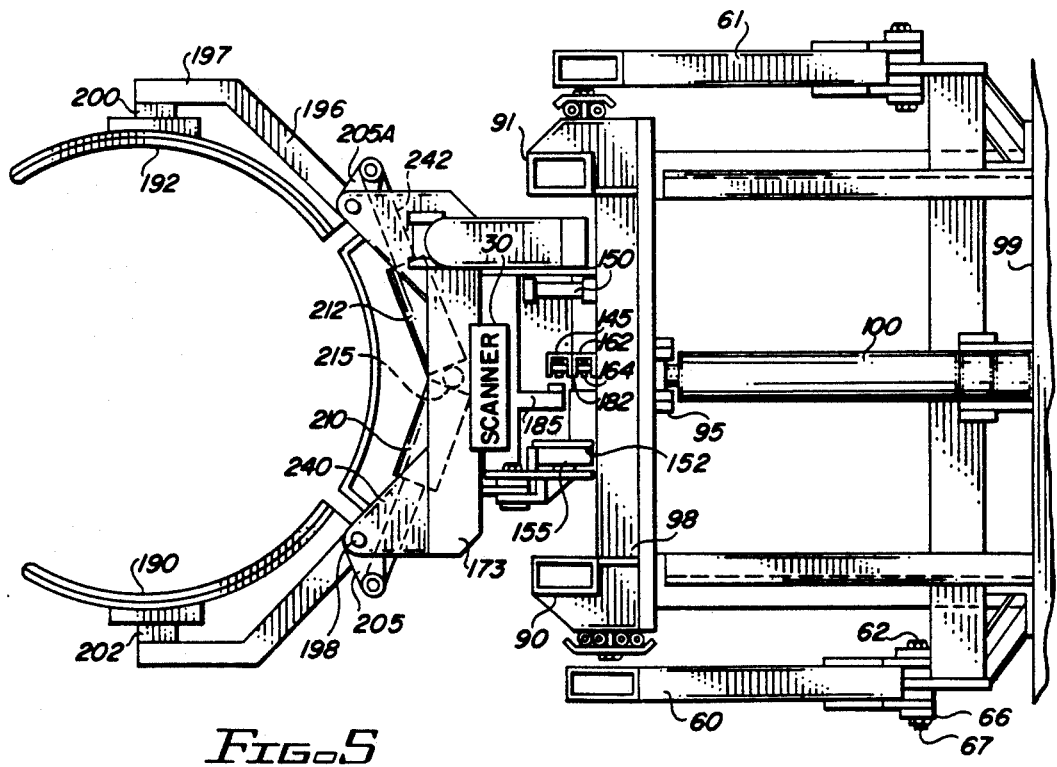
FIG. 5 is a sectional view taken along lines 5—5 of FIG. 4.

FIGS. 3, 4 and 5 best show the carriage 36 including a moveable carriage support 132 which along with the gripping mechanism 35 is reciprocally carried on the lift arm 40. The lift arm assembly includes a pair of spaced apart arms 150 and 151 which are parallel and are secured at their upper ends to the cross member 85 intermediate the inner boom arms. Each of the members 150 and 151 defines a generally rectangular inner channel 152 which receives a sliding block or roller 155 which is pivotally attached to the carriage support 132 by post 174 so that reciprocal traverse of the carriage support 132 is guided within the channels.

The carriage 36 is reciprocated by means of a length of roller chain 160 moveable within the centrally positioned track guide 145. Track guide 145 has two generally square cross-sectional channels 162 and 164 separated by intermediate wall 165. The track channels 162 and 164 are positioned adjacent one another extending from the lower end of the lift to approximately the elevation of the cross member. At this point, the channels curve to the rear and diverge extending around opposite sides of sprocket 170. The upper ends of the channels 162 and 164 curve in generally semi-circular fashion to bring the carriage 36 and engaged container to a dump position when the carriage is at the upper end of the track. The upper ends and the lift arm members 150 and 151 are also curved.

The carriage support 132 and attached container gripping mechanism which comprise the carriage are moved along channels 162 and 164 by means of chain 160 having rollers 182 that guide chain movement within the track sections 162 and 164. Carriage 36 is attached to one or more selective links of the chain by an arm 185. Track 162 has an axially extending slot in one side wall to accommodate attachment of the support arm 185. The drive chain is a section of chain of finite length.

In the dump position, a portion of the chain 160 extends around the lower half of the drive sprocket 170 and is guided in channel 164. In the lower or home position, the carriage and chain assume the position generally shown in FIG. 3 with the end of the chain still in engagement with the sprocket wheel. The rotational direction of the sprocket is controlled by drive motor 175 mounted at the upper end of the lift. Appropriate controls such as limit switches located on the lift serve to control the direction and speed of the raise-and-lowering cycles.

The container gripping mechanism is shown in FIGS. 3 to 6 and is pivotally secured to the carriage 36 at pivot 235 by post 174. Gripping assembly 35 includes a pair of oppositely disposed gripping arms 190 and 192 each having an inner surface which is configured to be complimentarily engageable with the exterior surface of the container 25. The configuration of the gripping arms may vary with the shape and sizes of the container used and for conventional cylindrical containers an arcuate shape is preferred. In the preferred embodiment illustrated for use with generally cylindrical refuse containers, the arms 190, 191 are curved and a space or opening is provided between the distal ends of the arms. Brackets 195 are bolted or otherwise secured at diametrically opposite locations to the exterior of the arms at a location along the central transverse axis XX of the circular shape generally formed by the gripping arms. A pivot arm 196 is associated with each of the gripping arms. Pivot arms 196 are pivotally secured between plates 204 at vertical pivot shaft 198. The outer ends of arms 196 each have a mounting section 197 spaced apart from the associated bracket. As will be explained in more detail hereafter, weight sensing members shown as load cells 200 and 202 are oppositely bolted to the brackets 195 and the mounting arm section 197 along the transverse axis which is indicated by XX. This positions the loads at opposite sides of the containers substantially on a line through the center of mass of the container.

A short lever arm 205, 205A projects at substantially right angles with respect to arms 196 at the end opposite mounting section 197. Actuators 210 and 212 control the opening and closing of the gripping arms 190 and 192 respectively. The head ends of the actuators 210 and 212 are commonly connected to a vertical pivot pin 215 secured to a support 173. Support 173 is attached to the lower end of carriage and may be pivotally secured to maintain the carriage in a generally horizontal position throughout extension and retraction by selective control of cylinder 250.

Rod 240 of gripping arm cylinder is pivotally attached to the end of lever arm 205. Similarly, the end of rod 242 of gripping arm actuator 212 is connected to the arm 205A. It will be apparent that retraction of the actuator rods 240, 242 will cause the gripping arms 190 and 191 to open to the position shown in dotted in FIG. 5. Operation of the actuators to extend the respective rod 240, 242, will cause the gripping arms to close to engage the exterior of the container. The full-open position also allows the gripping arms to assume a more compact travel position close to the vehicle to avoid interference with adjacent objects when the pick-up vehicle is moving between pick-up locations along a route.

Various types of weighing mechanisms can be provided as part of the loader to provide an indication of the weight of the trash. However, the use of at least one load cell incorporated into the gripping arm mechanism has been found to be particularly effective and reliable. As is known, a load cell is a transducer which, when subjected to certain forces, provides an accurate electrical signal representative of the forces to be measured. The construction of such transducers is well known and generally such devices incorporate a strain gauge load cell in which loads applied thereto provide an electrical output signal which is indicative of the weight of the article. Various types of devices are available and one particularly effective device is the No. 9123 Single Ended Shearbeam manufactured by Revere Transducers, Inc. Positioning the load cell transducers at opposite locations along a line through the center of mass of the container provides accurate readings and tends to minimize errors due to the fact that measurement occurs dynamically during loading and unloading of the container. Further, incorporation of the load cells into gripping arm assembly provides a particularly efficient and convenient structure as the container is supported for both weighing and dumping cycle operations by the gripping arms. The output from the load cell is supplied by means of either a hard wired conductor or transmitter to an appropriate decoder and on-board computer 21 which will process this information as will be more fully explained.

The operation of the loader assembly is controlled by a hydraulic system which includes appropriate manual controls in the vehicle cab such as an open/close gripping mechanism control unit having a control stick, extend/retract boom control unit having a control stick, and a on/off motor control unit having control lever. These controls and associated hydraulic circuit are not shown in the interest of clarity and are standard. However, for a more complete description of control systems of this type, reference is made to the disclosure in U.S. Pat. No. 5,007,786 entitled "Refuse Collection and Loading System".

As indicated above, the output from the load cells provides electrical signal indicative of the weight of the container. For purposes of weighing the contents of the trash container, the container is weighed in a weighing zone when elevated with a full load and weighed again as the container is returned downwardly through the weighing zone by the loading device in an empty condition. The weighing of the empty container establishes the tare weight so that the weight of the dumped contents can be accurately computed at each location and variables in the container weight will not effect the net refuse computation.

A single reading may be taken at the time the container is engaged and elevated or at any time during the upward movement of the container prior to the dumping operation. Similarly, the empty container or tare weight can be sensed at the load cell output at any time during the downward movement of the empty container prior to replacing the container on the ground. However, it is generally more effective and reliable to establish the weight readings during operation of the device during the upward and downward movement of the container rather than stopping the container during the cycle and allowing the device to settle out to achieve an accurate reading. Due to the dynamics of the loading and unloading operation, a reading at a single point during the upward and downward movement of the container may be subject to some inaccuracy during the shifting of the load, movement of the container and the like. It has been found preferable to take an average weight reading which may be computed from a continuous reading or series of readings taken during a portion of the lifting and lowering cycle when the container is at constant speed and not accelerating or decelerating. The continuous output of the load cells can be monitored during a selected portion of the container movement in a weighing zone 275 and this continuous reading averaged by the on-board computer. The weighing zone 275 is shown in FIG. 3 and comprises a predetermined travel distance along the loader during which the dynamic effects are minimized. With the loader shown, the weighting zone 275 is an intermediate location during which the lift is essentially at constant velocity.

To accomplish weighing, as seen in FIG. 7, proximity sensors 51 and 52 are vertically aligned along the lift arms so that during both the upward and downward movement of the carriage and associated load, the proximity sensors are progressively actuated or deactivated. As the sensor S1 is activated on the lift cycle, load cell readings are sampled or taken through the weighing zone until deactivated by sensor S1. The multiple readings are then decoded by a decoder and averaged by the on-board computer 21. Preferably, selected of the readings are used in the computation process with the computer disregarding, for example, the lowest and highest readings. The operation and sampling of load cell readings occurs both during the upward and downward movement of the carriage along the loader in the weighing zone 275 to establish tare and net weight as has been explained. The computer may include a display 278 for the driver indicating the weight of the contents of the container in process as well as the weight of the total load.

In addition, the system of the present invention provides a means of identifying the individual containers as they are processed. This enables the user of the container to be identified for billing purposes and also provides valuable information for route management. The containers may be color coded or labeled or provided with some type of indicia for identification to indicate a particular container being unloaded and weighed which indicia can be recognized by the driver-operator and the information appropriately input into the on-board computer by the driver-operator. However, a fully automated system is generally more desirable and to this end the containers are provided with an optical or electrical detection system and decoding and identification system to indicate and identify the container. Accordingly, in accordance with the preferred embodiment of the invention, each container is provided with a transponder 28 attached to the container at a location which may be detected by scanner 30 associated with the loader mechanism. Preferably, the transponder 28 (sometimes termed a "tag") is located on the side wall of the container 25 on a side which would be normally oriented toward the loader 22 during the pick-up operation. Each transponder 28 consists of an integrated circuit chip with a unique identification code and an antennae coil. A typical transponder of this type is the tag such as the TX1103 as manufactured by Destron/IDI. The RF energy from the scanner 30 energizes the transponder energy coil and the tag transmits an ID number when the tag passes near the ID scanner 30. The an ID number is read and reported to the on-board computer 21. The particular ID transponder mentioned above transmits information at the rate of 400 bits per second. Transponders of this type are manufactured in a variety of sizes and shapes but should be suitably protected in an encasement material to protect the transponder both from handling and environmental impact.

The load cells are oppositely arranged on the engagement device supporting the container. In FIG. 7, two cells 200 and 202 are shown and their readings will be averaged by the computer 21. The sampling rate, averaging, and processing of information are controlled by the microprocessor program which can be designed by a programmer and detail description is not deemed necessary.

The scanner 30 is shown in FIGS. 1, 3 and 7 and is located on the carriage 36 in a central location adjacent the gripper arms. In this position, the scanner is at an elevation which would normally align with the tag 28 when the container is engaged by the gripping arms. The scanner consists of an antennae coil and the appropriate exciter electronics. To obtain the best accuracy, the scanner antennae should be mounted in approximate and coaxial orientation to the transponder antenna. The scanner may be of various types commercially available. Once suitable type is the model 2300 scanner as manufactured by Deston/IDI. The scanner is connected to a suitable controller which enables the scanner at the initiation of the loading cycle. The controller receives the transponder ID number and transmits an RF signal to the on-board computer by a RS232 or RS422 serial communications link.

The above invention will be better understood from the following description of operation. The refuse materials to be handled and collected are first accumulated by users at a plurality of refuse containers at various locations. The mobile collection truck 14 with the automated loader and weighing assembly 22 of the present invention proceeds along a predetermined pick-up or collection route and approaches the pick-up site. The vehicle will pull along side the refuse container 25 to be emptied and through the controls, the operator will extend the lift arm assembly which laterally extends the gripping arms 35 from the refuse truck. The gripping arms 190, 192 are opened by means of pressurization of the rod end of cylinders 210 and 212 to allow the container to be received within the gripping area defined by the arms. The gripping arms are then closed about the container and the loading and weighing cycle is initiated.

As the loader assembly is returned to a vertical position along side the truck, the hydraulic motor 175 at the upper end of the lift arms is actuated to advance the drive chain and attached carriage in a direction upwardly along the channels 162, 164 to a position to dump the contents of the refuse container into the open top 18 of the refuse collection trailer. Once the container is engaged, the transponder 28 located on the exterior of the container is aligned with the scanner 30 located on the carriage and the RF energy from the scanner energizes the transponder energy coil and the transponder transmits an ID number which is read and reported to the on-board computer. This provides information which is stored in the computer 21 identifying the particular customer and location of the container. If the identification tag on the container is not properly aligned with the scanner, the properly trained operator can manipulate the gripping arms to rotate the container to bring the scanner and ID tag into alignment. Another arrangement is to mount the scanner on a track so it can be moved circumferentially about the container to align with the tag.

The refuse pick-up operation continues with the carriage and attached drive chain elevating the filled refuse container towards the dump position. The upward movement passage of the container into the weighing zone 275 will cause proximity sensor S1 and S2 to initiate the weighing operations in the lifting and return cycles. The sensors will cause the output of the load cells 200, 202 to be sampled so that a reading representative of the weight of the loaded container is provided to the on-board computer and preferably displayed to the operator. The load cells output are monitored for a predetermined time in the weighing zone so a number of progressive or sequential readings from the load cells are sampled. This sampling of readings are then averaged by the computer and the loaded container weight provided to the on-board computer. The averaging will provide accurate readings even if the container load is imbalanced.

Once the container reaches the upper arcuate portion of the boom assembly, it will tilt to a dump position. When the contents of the container have been received in the refuse vehicle, drive motor 175 is reversed causing the drive chain to move the carriage downwardly towards the home position. Simultaneously, the lift arms will begin to extend outwardly so that when the container reaches the ground, it will be returned to its original home position. As the empty container moves downwardly, the sensors S1 and S2 will actuate a weighing cycle which may be a single reading taken from the load cells or an average weight taken over a period of time on average obtained from a series of finite readings. This weight is the empty or tare weight of the container as stored in the computer 21 and used to compute the net load received from the particular container. This weight is added to the total and also stored with the container location. By establishing a tare weight for each container, the system will provide accurate net weight measurements for different containers and will compensate for residual refuse which may remain in or adhered to the container after dumping.

Periodically, which typically would be at the end of a working day, the information stored in the computer in the ERAM or other storage device may be downloaded to a central computer 280 where the information is processed for route scheduling and management and to invoice customers based on the actual weight of refuse collected. The total weight of refuse over a predetermined time collected at a certain location may be established and periodic billings based on usage computer.

As indicated above, the weighing systems is applicable to loaders of various types. FIGS. 8 and 9 show the weighing system in connection with a front end loader of conventional design. A mobile collection vehicle 325 is provided with a cab 328 which contains a power supply and on-board computer 330 which receives, processes and stores information from the load cells 340.

The load cells 340 are mounted on a lift 341 having U-shaped arms 345 which are pivotally attached at opposite sides of the vehicle at pivot shaft 348. The forward end of the lift is provided with forwardly extending forks 350 pivotally attached to the lift at their inner ends at pivot shafts 352. The angular relationship between the forks and the lift arms is adjusted by hydraulic actuator 355. The load cell 360 is bolted in place at the inner end of each fork between brackets 356 and 358 so as to be oppositely mounted on the container engaging and lifting device.

The load cell is shown in FIG. 9 and is the type which measures bending moment such as the type manufactured by Rice Lake, Model 9123 or by Interface, Model 500116 having a body with strain gauges internally mounted in the body. The forces imposed by the load will result in an electrical signal which is transmitted to the processing unit 330. Preferably, readings are taken after the lift has elevated the loaded container to a predetermined height and similarly at a predetermined height on the return angle after the container has been dumped when velocity is essentially constant. The lifting and return cycles may be interrupted to permit readings to be taken in a stable, stopped condition. The systems shown in FIG. 8 are more typical of commercial refuse collection systems. Operational cycle time is generally not a critical matter in commercial refuse as with residential systems. The container 360 is provided with suitable indicia 362 which may be manually read or electronically read by a scanner 364 mounted on the lift which information is transmitted to the computer. The load cells readings are averaged and processing is controlled by conventional software. The information is displayed to the operator and also stored in the unit 330 for subsequent down-loading.

FIG. 10 shows still another embodiment in which the weighing system is applied to a front end commercial mobile system designated by the numeral 400. The vehicle 402 has forwardly projecting forks 404 mounted on lift arms 406 at either side to elevate and dump the container 410 into the trailer and to return it to a home position on the ground. The container 410 has opposite channels 412 which receive the forks. The forks are each provided with a pair of spaced apart load cells 414, 416 along their top edge. The load cells will emit an electrical signal to indicative of weight when the forks are in the channels and the container elevated imposing a force on the load cells. The cells are compression type load cells and are commercially available from manufacturers such as Rice Lake and Interface. The output from the load cells is received, averaged and processed at on-board microprocessor 425.

The weight readings are taken during a relatively stable portion of the lifting and lowering operation or during a time when the lift is momentarily stopped to allow the signals to "settle-out".

From the foregoing it will be seen that the present invention provides a unique and accurate weighing system particularly suited for mobile refuse collection systems which will provide accurate and reliable information for customer billing and route management. The system is adaptable to various mobile trucks and lift designs and useable with containers of various styles, both residential and commercial.

It will be obvious to those skilled in the art to make various changes, alterations and modifications to the refuse collection and weighing system of the present invention. To the extent such changes, alterations and modifications do not depart from the spirit and scope of the appended claims, they are intended to be encompassed therein.

I claim:

1. An improved weighing loader for a refuse vehicle for lifting a refuse container from a surface, weighing the contents of the container and emptying the contents thereof into a vehicle refuse compartment having an access area, said improved loader comprising:
   (a) a lift assembly attachable to said vehicle;
   (b) carriage means reciprocal along said lift assembly;
   (c) drive means for operatively driving said carriage means reciprocally along said lift assembly;
   (d) gripping means operatively carried on said carriage means, said gripping means including a pair of opposed first and second gripping arms and further including actuator means for opening and closing said first and second gripping arms with respect to each other in order to releasably retain and release a refuse container, said gripping arms being configured to freely support said container;
   (e) load cell means mounted on said gripping means and supporting said gripping arms at opposite locations with respect to the configuration of the container, said load cell means providing an electrical output signal representative of the weight supported by the gripping arms; and
   (f) processing means for monitoring said load cell means output signal during upward and downward travel of the carriage means to determine the net weight of the contents of the container.

2. The loader of claim 1 further including sensor means which upon reciprocal movement of the carriage means with respect to the loader assembly will cause a plurality of load cell output signal readings to be taken.

3. The loader of claim 1 further including on-board information processing means for receiving and processing the load cell output signals.

4. The loader of claim 3 further including machine-readable indicia associated with each of said refuse containers and scanner means associated with said loader for reading the indicia and reporting the information to said processing means.

5. The loader of claim 4 wherein said machine-readable indicia comprises a transponder having a unique identification code and wherein said scanner includes means for energizing the transponder.

6. A method of obtaining weight information relative to the weight of refuse collected from a plurality of individual refuse containers at spaced apart locations along a collection route, said method comprising:
   (a) engaging selected of said containers by engagement means associated with a mobile collection vehicle;
   (b) providing said engagement means with load cells generally displaced at locations at opposite sides of an engaged container;
   (c) elevating the said container from a position on the ground to a dump position;
   (d) taking at least one reading from said load cells when said container is being elevated when the container is relatively stable and freely supported on said engagement means to establish the total weight of the container;
   (e) returning said container from said dump position to said ground position;
   (f) taking at least one reading from said load cells when said container is moving downward and when said container is relatively stable and freely supported on said engagement means to establish the tare weight of the container; and
   (g) comparing the net weight and the tare weight to establish the net weight of the contents of the container.

7. The method of claim 6 in which said method is repeated along said route at a plurality of collection locations.

8. The method of claim 6 further including the step of providing each container with identifiable indicia and reading said indicia and storing the identification with the net weight determined for the particular container.

9. The method of claim 8 wherein said information is stored in an onboard computer.

10. The method of claim 9 wherein said information is down loaded at predetermined times.

11. The method of claim 10 wherein said information is utilized for purposes of billing customers and route management.

12. The method of claim 6 wherein said load cell readings are averaged by said processing means.

13. The method of claim 6 wherein a plurality of readings are taken by said load cells to establish the total weight and tare weight of the container.

* * * * *